United States Patent
Stockhammer et al.

(10) Patent No.: US 10,567,734 B2
(45) Date of Patent: Feb. 18, 2020

(54) PROCESSING OMNIDIRECTIONAL MEDIA WITH DYNAMIC REGION-WISE PACKING

(71) Applicant: QUALCOMM Incorporated, San Diego, CA (US)

(72) Inventors: Thomas Stockhammer, Bergen (DE); Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/115,355

(22) Filed: Aug. 28, 2018

(65) Prior Publication Data

US 2019/0068946 A1 Feb. 28, 2019

Related U.S. Application Data

(60) Provisional application No. 62/551,688, filed on Aug. 29, 2017.

(51) Int. Cl.
| | |
|---|---|
| *H04N 13/00* | (2018.01) |
| *H04N 13/161* | (2018.01) |
| *H04N 21/235* | (2011.01) |
| *H04N 5/232* | (2006.01) |
| *H04N 21/236* | (2011.01) |

(52) U.S. Cl.
CPC ....... *H04N 13/161* (2018.05); *H04N 5/23238* (2013.01); *H04N 21/2355* (2013.01); *H04N 21/23605* (2013.01)

(58) Field of Classification Search
CPC ............. H04N 13/161; H04N 21/2355; H04N 21/23605; H04N 5/23238; H04N 5/234345; H04N 21/23439; H04N 21/21805; H04N 21/440245; H04N 21/6587; H04N 21/816; H04N 21/84; H04N 21/8456; H04N 21/2662
See application file for complete search history.

(56) References Cited

U.S. PATENT DOCUMENTS

2017/0237965 A1 8/2017 Wang et al.
2017/0346906 A1* 11/2017 Bouazizi ............. H04L 65/1069
(Continued)

OTHER PUBLICATIONS

Oh et al. "OMAF: Generalized signaling of region-wise packing for omnidirectional video". Apr. 2017. (Year: 2017).*
(Continued)

*Primary Examiner* — Zhihan Zhou
(74) *Attorney, Agent, or Firm* — Shumaker & Sieffert, P.A.

(57) ABSTRACT

An example device for processing video data includes a memory configured to store an omnidirectional video stream, and a processor implemented in circuitry and configured to process (e.g., encode, transmit, receive, or decode) a first frame of a set of file format samples of the omnidirectional video stream, the set of file format samples referring to a sample entry, the first frame having a first region-wise packing scheme, and process a second frame of the set of file format samples referring to the sample entry, the second frame having a second region-wise packing scheme different than the first region-wise packing scheme. In this manner, a single omnidirectional video bitstream may include an entire virtual reality (VR) video content with most-requested regions being optimized with a largest number of color samples per unit of area.

28 Claims, 7 Drawing Sheets

(56) References Cited

U.S. PATENT DOCUMENTS

| | | | |
|---|---|---|---|
| 2018/0061002 A1* | 3/2018 | Lee | H04N 19/88 |
| 2018/0063505 A1* | 3/2018 | Lee | H04N 13/106 |
| 2018/0198979 A1* | 7/2018 | Katsumata | G06T 5/00 |
| 2018/0365798 A1* | 12/2018 | Woo | G06T 3/0062 |
| 2019/0052858 A1* | 2/2019 | Yip | H04N 5/232 |
| 2019/0141311 A1* | 5/2019 | Lee | H04N 13/194 |
| 2019/0174116 A1* | 6/2019 | Oh | H04N 13/178 |

OTHER PUBLICATIONS

ITU-T H.265, Series H: Audiovisual and Multimedia Systems, Infrastructure of audiovisual services—Coding of moving video, Advanced video coding for generic audiovisual services, the International Telecommunication Union. Apr. 2015, 634 pp.

International Standard ISO/IEC 14496-12, Information Technology—Coding of audio-visual objects—Part 12: ISO base media file format, Third Edition, Oct. 15, 2008, 120 pp.

"Information technology—Coding of audio-visual objects—Part 15: Carriage of network abstraction layer (NAL) unit structured video in the ISO base media file format," International Standard Organization, ISO/IEC FDIS 14496-15-2014; Jan. 13, 2014, 179 pp.

International Standard, "Information Technology—High Efficiency Coding and Media Delivery in Heterogeneous Environments—Part 2: High efficiency video coding," ISO/IEC 23008-2, First edition, Dec. 1, 2013, 312 pp.

ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 1, 2012 (Apr. 1, 2012), pp. I-VI, 1-126, XP002712145, paragraph A.7-A.9 paragraph [OA.4].

Feilding, "Hypertext Transfer Protocol—HTTP/1.1; rfc2616.Txt," Jun. 1, 1999, Jun. 1, 1999 (Jun. 1, 1999), XP015008399, pp. 1-177, ISSN: 0000-0003.

Paila T., et al., "Flute-File Delivery over Unidirectional Transport," Network Working Group, RFC 6726, Nov. 2012, Retrieved from http://tools.ietf.org/html/rfc6726, 46 Pages.

Wang Y.K., et al., "SEI messages on SEI Messages", 27th JCT-VC Meeting; Mar. 31, 2017-Jul. 4, 2017; Hobart; (Joint Collaborative Team on Video Coding of ISO/IEC JTC1/SC29/WG11 and ITU-T SG.16); URL: HTTP://WFTP3.ITU.INT/AV-ARCH/JCTVC-SITE/,,No. JCTVC-AA0026, Mar. 21, 2017, XP030118192, 5 pages.

Wang Y.K., et al., "Omnidirectional media format SEI messages," 28th JCT-VC Meeting; Jul. 15, 2017-Jul. 21, 2017; Torino, IT; (Joint Collaborative Team on Video Coding of ISO/IEC JTC1/SC29/WG11 and ITU-T SG.16); No. JCTVC-AB0026v3, 12 pages.

International Search Report and Written Opinion—PCT/US2018/048594—ISA/EPO—dated Oct. 25, 2018—21 pp.

Oh M-K., et al: "Region Wise Quality Indication SEI Message", Input Document to JCT-VC, Apr. 2, 2017 (Apr. 2, 2017), pp. 1-4, XP055516333, Hobart, AU Retrieved from the Internet: URL:http://phenix.it-sudparis.eujjctjdocenduser/documents/27Hobartjwg11/JCTVC-AA0030-v2.zip—[retrieved on Oct. 17, 2018].

Sullivan G et al: "Meeting report of the 27th meeting of the Joint Collaborative Team on Video Coding (JCT-VC)," Hobart, AU, Mar. 31-Apr. 6, 2017 11, Joint Collaborative Team on Video Coding (JCT-VC) of ITU-T SG16 WP3 and SO/IEC JTC1/SC29/WG11, Apr. 7, 2017 (Apr. 7, 2017), pp. 1-59, XP055516464, Hobart, Tasmania, AU, Retrieved rom the Internet: URL:https://www.google.comjurl?sa=t&rct=j&q=&esrc=s&source=web&cd=3&ved=2ahUKEwiEne34-YzeAhXKyqQKHbZmAAg . . . s%3A%2F%2Fwww.itu.int%2Fwftp3%2Fav-arch%2Fjctvc-site%2F201703AAHobart%.

* cited by examiner

PROCESSING OMNIDIRECTIONAL MEDIA WITH DYNAMIC REGION-WISE PACKING

This application claims the benefit of U.S. Provisional Application No. 62/551,688, filed Aug. 29, 2017, the entire content of which is hereby incorporated by reference.

TECHNICAL FIELD

This disclosure relates to storage and transport of encoded media data, such as video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, such as scalable and multiview extensions, to transmit and receive digital video information more efficiently.

After media data has been encoded, the media data may be packetized for transmission or storage. The media data may be assembled into a media file conforming to any of a variety of standards, such as the International Organization for Standardization (ISO) base media file format (BMFF) and extensions thereof, such as AVC.

SUMMARY

In general, this disclosure describes techniques related to processing and transmission (e.g., sending and/or receiving or retrieving) of omnidirectional video and other media data with dynamic region-wise packing. Dynamic region-wise packing may generally refer to region-wise packing schemes that can change within a set of file format samples referring to a common sample entry, from the most extent, from frame to frame of video data. Such techniques may be used, e.g., for virtual reality (VR), augmented reality, and/or 360-degree video applications. Dynamic region-wise packing may generally enable VR media service providers to provide a single omnidirectional video bitstream providing an entire VR video content with most-requested regions being optimized to include a largest number of color samples per unit of area. The most requested regions can be initialized as the regions by the director's cut, and may later be updated according to retrieval statistics.

In one example, a method of processing video data includes processing a first frame of a set of file format samples of an omnidirectional video stream, the set of file format samples referring to a sample entry, the first frame having a first region-wise packing scheme, and processing a second frame of the set of file format samples referring to the sample entry, the second frame having a second region-wise packing scheme different than the first region-wise packing scheme.

In another example, a device for processing video data includes a memory configured to store an omnidirectional video stream, and a processor implemented in circuitry and configured to process a first frame of a set of file format samples of the omnidirectional video stream, the set of file format samples referring to a sample entry, the first frame having a first region-wise packing scheme, and processing a second frame of the set of file format samples referring to the sample entry, the second frame having a second region-wise packing scheme different than the first region-wise packing scheme.

In another example, a computer-readable storage medium has stored thereon instructions that, when executed, cause a processor to process a first frame of a set of file format samples of an omnidirectional video stream, the set of file format samples referring to a sample entry, the first frame having a first region-wise packing scheme, and process a second frame of the set of file format samples referring to the sample entry, the second frame having a second region-wise packing scheme different than the first region-wise packing scheme.

The details of one or more examples are set forth in the accompanying drawings and the description below. Other features, objects, and advantages will be apparent from the description and drawings, and from the claims.

DETAILED DESCRIPTION

Figure 1:
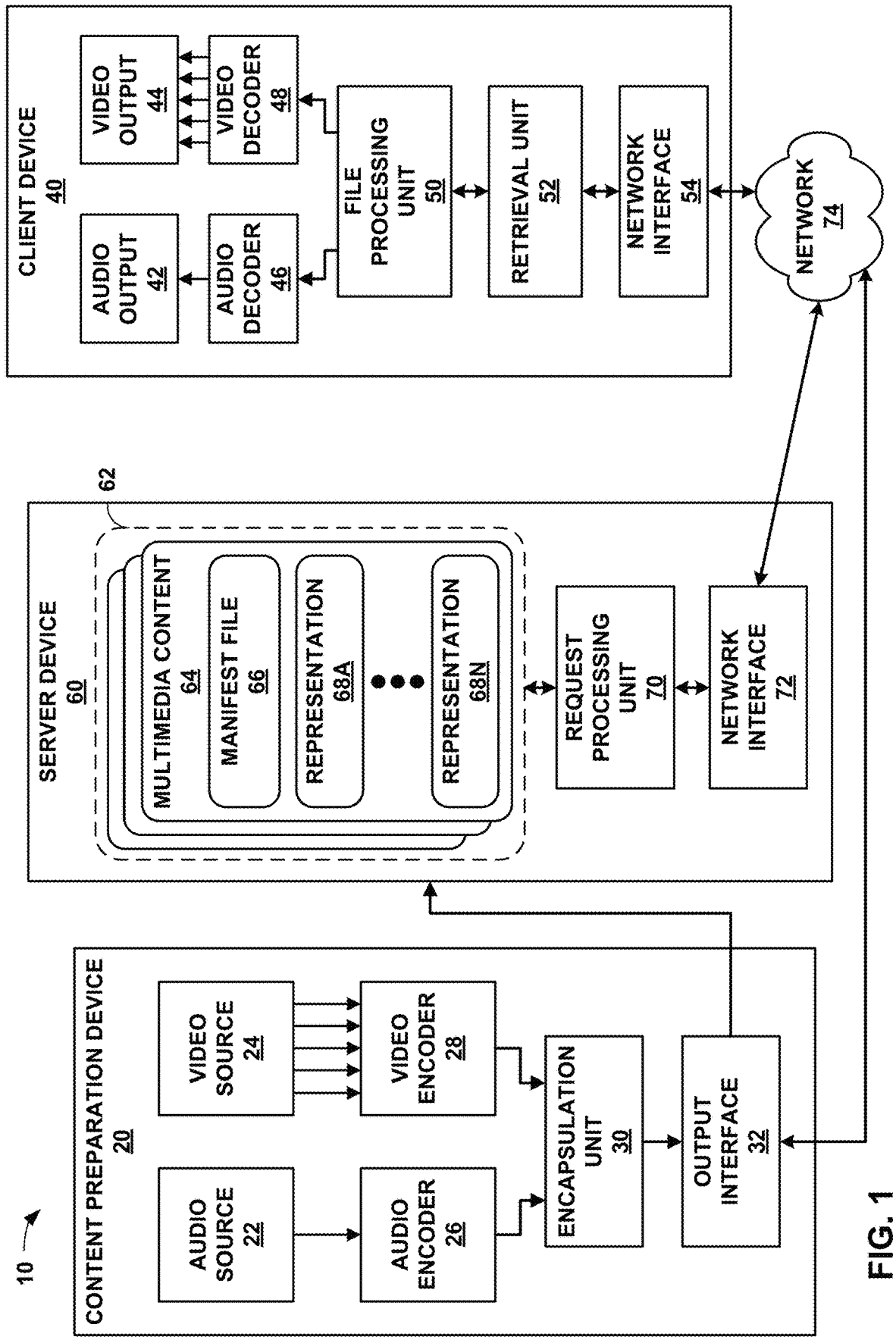
FIG. 1 is a block diagram illustrating an example system that implements techniques for streaming media data over a network.

The techniques of this disclosure may be applied to video files conforming to video data encapsulated according to any of ISO base media file format (ISOBMFF), extensions to ISOBMFF, Scalable Video Coding (SVC) file format, Advanced Video Coding (AVC) file format, High Efficiency Video Coding (HEVC) file format, Third Generation Partnership Project (3GPP) file format, and/or Multiview Video Coding (MVC) file format, or other video file formats. A draft of ISOBMFF is specified in ISO/IEC 14496-12, available from phenix.int-evey.fr/mpeg/doc_end_user/documents/111_Geneva/wg11/w15177-v6-w15177.zip. A draft of another example file format, MPEG-4 file format, is specified in ISO/IEC 14496-15, available from wg11.sc29.org/doc_end_user/documents/115_Geneva/wg11/w16169-v2-w16169.zip.

ISOBMFF is used as the basis for many codec encapsulation formats, such as the AVC file format, as well as for many multimedia container formats, such as the MPEG-4 file format, the 3GPP file format (3GP), and the digital video broadcasting (DVB) file format.

In addition to continuous media, such as audio and video, static media, such as images, as well as metadata, can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box is an elementary syntax structure in ISOBMFF, including a four-character coded box type, the byte count of the box, and the payload. An ISOBMFF file includes a sequence of boxes, and boxes may contain other boxes. According to ISOBMFF, a Movie box ("moov") contains the metadata for the continuous media streams present in the file, each one represented in the file as a track. Per ISOBMFF, metadata for a track is enclosed in a Track box ("trak"), while the media content of a track is either enclosed in a Media Data box ("mdat") or provided directly in a separate file. The media content for tracks includes a sequence of samples, such as audio or video access units.

ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g., for progressive download or DASH. For streaming purposes, movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

Virtual reality (VR) is the ability to be virtually present in a virtual, non-physical world created by the rendering of natural and/or synthetic images and sounds correlated by movements of an immersed user, allowing interaction with that virtual world. With recent progress made in rendering devices, such as head mounted displays (HMD) and VR video (often also referred to as 360-degree video) creation, a significant quality of experience can be offered. VR applications include gaming, training, education, sports video, online shopping, entrainment, and so on.

A typical VR system includes the following components and steps:
1) A camera set, which typically includes multiple individual cameras pointing in different directions, ideally collectively covering all viewpoints around the camera set.
2) Image stitching, where video pictures taken by the multiple individual cameras are synchronized in the time domain and stitched in the space domain, to be a spherical video, but mapped to a rectangular format, such as equi-rectangular (like a world map) or cube map.
3) The video in the mapped rectangular format is encoded/compressed using a video codec, e.g., H.265/HEVC or H.264/AVC.
4) The compressed video bitstream(s) may be stored and/or encapsulated in a media format and transmitted (possibly only the subset covering the area being seen by a user, sometimes referred to as the viewport) through a network to a receiving device (e.g., a client device).
5) The receiving device receives the video bitstream(s) or part thereof, possibly encapsulated in a file format, and sends the decoded video signal or part thereof to a rendering device (which may be included in the same client device as the receiving device).
6) The rendering device can be, e.g., an HMD, which can track head movement and even eye move moment, and may render the corresponding part of the video such that an immersive experience is delivered to the user.

Omnidirectional MediA Format (OMAF) is being developed by the Moving Pictures Experts Group (MPEG) to define a media format that enables omnidirectional media applications, focusing on VR applications with 360-degree video and associated audio. OMAF specifies a list of projection methods that can be used for conversion of a spherical or 360-degree video into a two-dimensional rectangular video, followed by how to store omnidirectional media and the associated metadata using the ISO base media file format (ISOBMFF) and how to encapsulate, signal, and stream omnidirectional media using dynamic adaptive streaming over HTTP (DASH), and finally, which video and audio codecs, as well as media coding configurations, can be used for compression and playback of the omnidirectional media signal. OMAF is to become ISO/IEC 23090-2, and a draft specification is available to MPEG members from wg11.sc29.org/doc_end_user/documents/119_Torino/wg11/16950.zip.

In HTTP streaming protocols, such as DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

DASH is specified in ISO/IEC 23009-1, and is a standard for HTTP (adaptive) streaming applications. ISO/IEC 23009-1 mainly specifies the format of the media presentation description (MPD), also known as a manifest or manifest file, and media segment formats. The MPD describes the media available on a server and allows a DASH client to autonomously download an appropriate media version at an appropriate media time.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

A typical procedure for DASH based HTTP streaming includes the following steps:

1) A DASH client obtains the MPD of a streaming content, e.g., a movie. The MPD includes information on different alternative representations, e.g., bit rate, video resolution, frame rate, audio language, of the streaming content, as well as URLs of the HTTP resources (the initialization segment and the media segments).

2) Based on information in the MPD and local information available to the DASH client, e.g., network bandwidth, decoding/display capabilities, and user preferences, the DASH client requests the desired representation(s), one segment (or a part thereof) at a time.

3) When the DASH client detects a network bandwidth change, it requests segments of a different representation with a better-matching bitrate, ideally starting from a segment that starts with a random access point.

During an HTTP streaming "session," to respond to a user request to seek backward to a past position or forward to a future position, the DASH client requests past or future segments starting from a segment that is close to the desired position and that ideally starts with a random access point. The user may also request to fast-forward the content, which may be realized by requesting data sufficient for decoding only intra-coded video pictures or only a temporal subset of the video stream.

Video data may be encoded according to a variety of video coding standards. Such video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

This disclosure describes various constraints that may be added to the OMAF draft specification and/or other standards (e.g., DASH, ISO BMFF, HEVC, or the like) to improve processing of media data (such as encapsulation, decapsulation, encoding, and/or decoding). In general, such constraints allow devices to infer characteristics of a media bitstream, such that events that cannot happen according to the constraint need not be accounted for, e.g., by a data assembler/constructor (such as a content preparation device or server device) or by a data parser (such as a client device, e.g., a file processing unit or decapsulation unit). For example, if a constraint specifies that certain data may only be present when a condition is true, if the condition is false, the constrained data need not be processed. Additionally or alternatively, if the data is present, then the stated condition can be inferred to be true. More particularly, a context-free grammar corresponding to a bitstream may be formed that accounts for the various conditions to specify whether subsequent data corresponds to the constrained data or not. Likewise, a data generation unit and a data parsing unit may be implemented and configured according to the context-free grammar.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for the encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in the encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/Advanced Video Coding (AVC) and ITU-T H.265/High Efficiency Video Coding (HEVC), define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a conforming decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile idc (profile indicator) value, while a level may be signaled with a level idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to file processing unit 50. File processing unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and file processing unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or file processing unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to file processing unit 50, via retrieval unit 52. File processing unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
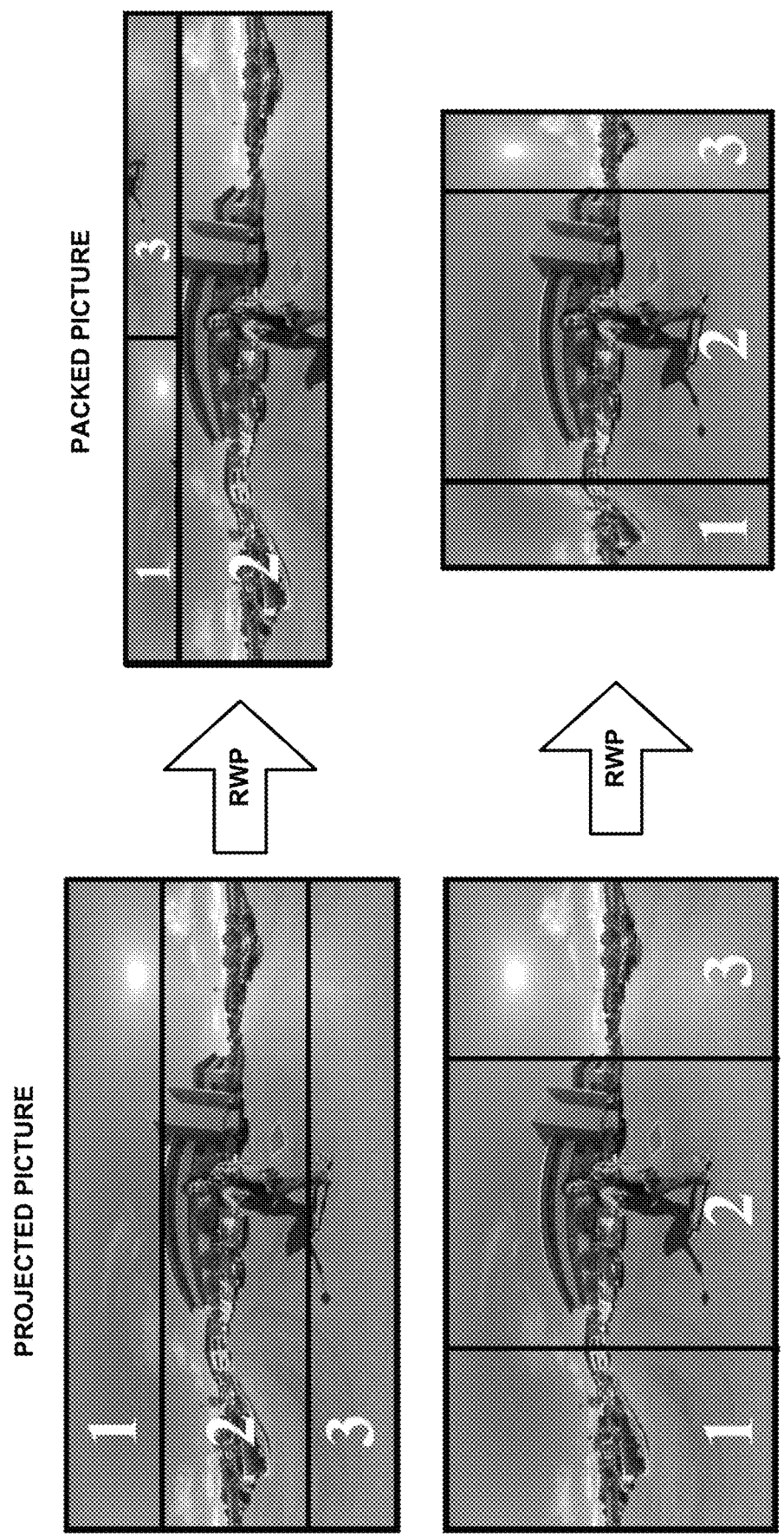
FIG. 2 is a conceptual diagram illustrating an example region-wise packing process according to the Omnidirectional MediA Format (OMAF) draft specification.

FIG. 2 is a conceptual diagram illustrating an example region-wise packing process according to the OMAF draft specification. The OMAF draft specification specifies a mechanism called region-wise packing (RWP). RWP enables manipulations (resize, reposition, rotation, and mirroring) of any rectangular region of a projected picture. RWP can be used to generate an emphasis on a specific viewport orientation or circumvent weaknesses of projections such as oversampling towards the poles in ERP. The latter is depicted in the top of FIG. 2, where the areas near the poles of the sphere video are reduced in resolution. The bottom of FIG. 2 depicts an example for an emphasized viewport orientation.

Information on RWP is signaled in the RWP box, for which the RegionWisePackingStruct that specifies the information carried in the RWP box is specified in clause 7.2.3 of the latest OMAF draft text, as follows.

JCT-VC document JCTVC-AA0026 (Wang, "Omnidirectional media format SEI messages," JCT-VC of ITU-T SG 16 WP 3 and ISO/IEC JTC 1/SC 29/WG 11, 28$^{th}$ Meeting: Torino, IT, 15-21 Jul. 2017, available from phenix.int-evey.fr/jct/doc_end_user/documents/28_Torino/wg11/JCTVC-AB0026-v3.zip) includes an omnidirectional region-wise packing SEI message for signaling of RWP information in video bitstreams.

The OMAF draft specification specifies the syntax and semantics of the omnidirectional region-wise packing SEI message as follows:

|  | Descriptor |
|---|---|
| omni_region_wise_packing( payloadSize ) { |  |
|   omni_region_wise_packing_cancel_flag | u(1) |
|   if( !omni_region_wise_packing_cancel_flag) { |  |
|     omni_region_wise_packing_persistence_flag | u(1) |
|     rwp_reserved_zero_6bits | u(6) |
|     num_packed_regions | u(8) |
|     proj_picture_width | u(16) |
|     proj_picture_height | u(16) |
|     for( i = 0; i < num_packed_regions; i++ ) { |  |
|       rwp_reserved_zero_4bits[ i ] | u(4) |
|       packing_type[ i ] | u(4) |
|       if( packing_type[ i ] = = 0) { |  |
|         proj_reg_width[ i ] | u(16) |
|         proj_reg_height[ i ] | u(16) |
|         proj_reg_top[ i ] | u(16) |
|         proj_reg_left[ i ] | u(16) |
|         transform_type[ i ] | u(3) |
|         rwp_reserved_zero_5bits[ i ] | u(5) |
|         packed_reg_width[ i ] | u(16) |
|         packed_reg_height[ i ] | u(16) |
|         packed_reg_top[ i ] | u(16) |
|         packed_reg_left[ i ] | u(16) |
|       } |  |
|     } |  |
|   } |  |
| } |  |

The omnidirectional region-wise packing SEI message provides information to enable remapping of the color samples of the output decoded pictures onto projected pictures. The definitions of "projected picture" and "packed picture" are as defined in the latest OMAF draft text.

omni_region_wise_packing_cancel_flag equal to 1 indicates that the SEI message cancels the persistence of any previous omnidirectional region-wise packing SEI message in output order. omni_region_wise_packing_cancel_flag equal to 0 indicates that omnidirectional region-wise packing information follows.

omni_region_wise_packing_persistence_flag specifies the persistence of the omnidirectional region-wise packing SEI message for the current layer.

omni_region_wise_packing_persistence_flag equal to 0 specifies that the omnidirectional region-wise packing SEI message applies to the current decoded picture only.

Let picA be the current picture. omni_region_wise_packing_persistence_flag equal to 1 specifies that the omnidirectional region-wise packing SEI message persists for the current layer in output order until one or more of the following conditions are true:

A new CLVS of the current layer begins.

The bitstream ends.

A picture picB in the current layer in an access unit containing an omnidirectional region-wise packing SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

When an omnidirectional projection indication SEI message with omni_projection_information_cancel_flag equal to 0 is not present in the CLVS that applies to the current picture and precedes the omnidirectional region-wise packing SEI message in decoding order, an omnidirectional region-wise packing SEI message with omni_region_wise_packing_persistence_flag equal to 0 shall not be present in the CLVS that applies to the current picture. Decoders shall ignore omnidirectional region-wise packing SEI messages with omni_region_wise_packing_persistence_flag equal to 0 that do not follow, in decoding order, an omnidirectional projection indication SEI message with omni_projection_information_cancel_flag equal to 0 in the CLVS that applies to the current picture.

rwp_reserved_zero_6 bits shall be equal to 0 in bitstreams conforming to this version of this Specification. Other values for rwp_reserved_zero_6 bits[i] are reserved for future use by ITU-T|ISO/IEC. Decoders shall ignore the value of rwp_reserved_zero_6 bits[i].

num_packed_regions specifies the number of packed regions. The value of num_packed_regions shall be greater than 0.

proj_picture_width and proj_picture_height specify the width and height, respectively, of the projected picture. The value of proj_picture_width and proj_picture_height shall be both greater than 0.

rwp_reserved_zero_4 bits shall be equal to 0 in bitstreams conforming to this version of this Specification. Other values for rwp_reserved_zero_4 bits[i] are reserved for future use by ITU-T|ISO/IEC. Decoders shall ignore the value of rwp_reserved_zero_4 bits[i].

packing_type[i] specifies the type of region-wise packing. packing_type[i] equal to 0 indicates rectangular region-wise packing. Other values are reserved. The value of packing_type[i] shall be equal to 0 in this version of this Specification. Decoders shall allow values of packing_type[i] greater than 0 and shall ignore all omnidirectional region-wise packing SEI messages with packing_type[i] greater than 0 for any value of i.

proj_reg_width[i], proj_reg_height[i], proj_reg_top[i], and proj_reg_left[i] are indicated in units of luma samples in a projected picture with width and height equal to prof picture width and prof picture height, respectively.

proj_reg_width[i] specifies the width of the i-th projected region. proj_reg_width[i] shall be greater than 0.

proj_reg_height[i] specifies the height of the i-th projected region. proj_reg_height[i] shall be greater than 0.

proj_reg_top[i] and proj_reg_left[i] specify the top luma sample row and the left-most luma sample column, respectively, in the projected picture. The values of proj_reg_top[i] and proj_reg_left[i], shall be in the range from 0, inclusive, indicating the top-left corner of the projected picture, to proj_picture_height−1, inclusive, and proj_picture_width−1, inclusive, respectively.

The sum proj_reg_width[i] and proj_reg_left[i] shall be less than proj_picture_width. The sum of proj_reg_height[i] and proj_reg_top[i] shall be less than proj_picture_height.

When the projected picture is stereoscopic, proj_reg_width[i], proj_reg_height[i], proj_reg_top[i] and proj_reg_left[i] shall be such that the projected region identified by these fields is within a single constituent picture of the projected picture.

transform_type[i] specifies the rotation and mirroring that have been applied to the i-th projected region to map it to the packed picture before encoding. When transform_type[i] specifies both rotation and mirroring, rotation has been applied after mirroring in the region-wise packing from the projected picture to the packed picture before encoding. The values of transform_type[i] are specified in the following table:

Table of transform_type[ i ] values

| Value | Description |
|---|---|
| 0 | no transform |
| 1 | mirroring horizontally |
| 2 | rotation by 180 degrees (counter-clockwise) |
| 3 | rotation by 180 degrees (counter-clockwise) after mirroring horizontally |
| 4 | rotation by 90 degrees (counter-clockwise) after mirroring horizontally |
| 5 | rotation by 90 degrees (counter-clockwise) |
| 6 | rotation by 270 degrees (counter-clockwise) after mirroring horizontally |
| 7 | rotation by 270 degrees (counter-clockwise) | rwp_reserved_zero_5 bits shall be equal to 0 in bitstreams conforming to this version of this Specification. Other values for rwp_reserved_zero_5 bits[i] are reserved for future use by ITU-T|ISO/IEC. Decoders shall ignore the value of rwp_reserved_zero_5 bits[i].

packed_reg_width[i], packed_reg_height[i], packed_reg_top[i], and packed_reg_left[i] specify the width, height, the top luma sample row, and the left-most luma sample column, respectively, of the packed region in the packed picture.

Let packedPicWidth and packedPicHeight be the width and height of the packed picture, which has the same size as the conformance cropping window. The values of packed_reg_width[i], packed_reg_height[i], packed_reg_top[i], and packed_reg_left[i] are constrained as follows:
  packed_reg_width[i] and packed_reg_height[i] shall both be greater than 0.
  The values of packed_reg_top[i] and packed_reg_left[i] shall in the range from 0, inclusive, indicating the top-left corner luma sample of the packed picture, to packedPicHeight−1, inclusive, and packedPicWidth−1, inclusive, respectively.
  The sum of packed_reg_width[i] and packed_reg_left[i] shall be less than packedPicWidth.
  The sum of packed_reg_height[i] and packed_reg_top[i] shall be less than packedPicHeight.
  The rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[j] for any value of j in the range of 0 to i−1, inclusive.

The OMAF draft specification specifies certain restricted scheme types in clause 7.3.1, as follows:
Scheme Types
Projected Omnidirectional Video ('podv')
The use of the projected omnidirectional video scheme for the restricted video sample entry type 'resv' indicates that the decoded pictures are packed pictures containing either monoscopic or stereoscopic content. The use of the projected omnidirectional video scheme is indicated by scheme_type equal to 'podv' (projected omnidirectional video) within SchemeTypeBox or CompatibleSchemeTypeBox.

The format of the projected monoscopic pictures is indicated with the ProjectedOmnidirectionalVideoBox contained within the SchemeInformationBox. One and only one ProjectedOmniVideoBox shall be present in the SchemeInformationBox when the scheme type is 'podv'.

NOTE: Any projection_type value is allowed, when 'podv' scheme_type is used, and 'podv' can also be used with potential projection_type values specified in future versions of this document.

When the ProjectedOmniVideoBox is present in the SchemeInformationBox, StereoVideoBox may be present in the same SchemeInformationBox.

For stereoscopic video, the frame packing arrangement of the projected left and right pictures is indicated with the StereoVideoBox contained within the SchemeInformationBox. The absence of StereoVideoBox indicates that the omnidirectionally projected content of the track is monoscopic. When StereoVideoBox is present in the SchemeInformationBox for the omnidirectional video scheme, stereo_scheme shall be equal to 4 and stereo_indication_type shall indicate that either the top-bottom frame packing or the side-by-side frame packing is in use and that quincunx sampling is not in use.

Optional region-wise packing is indicated with the RegionWisePackingBox contained within the ProjectedOmniVideoBox. The absence of RegionWisePackingBox indicates that no region-wise packing is applied, i.e., that the packed picture is identical to the projected picture.

Equirectangular Projected Video ('erpv')
NOTE: This scheme type can be used for specifying media profiles.

When scheme_type is equal to 'erpv' in SchemeTypeBox or CompatibleSchemeTypeBox, the track conforms to the constraints of scheme_type equal to 'podv' with all of the following additional constraints:
  ProjectionFormatBox within the ProjectedOmniVideoBox shall indicate the equirectangular projection.
  When RegionWisePackingBox is present, the following constraints all apply:
    The value of num_regions shall be equal to HorDiv1*VerDiv1.
    The value of packing_type[i] shall be equal to 0.
    The value of transform_type[i] shall be equal to 0.
    The value of packed_reg_width[i] shall be equal to proj_reg_width[i].
    The value of packed_reg_height[i] shall be equal to proj_reg_height[i].

Packed Equirectangular or Cubemap Projected Video ('ercm')
NOTE: This scheme type can be used for specifying media profiles.

When scheme_type is equal to 'ercm' in SchemeTypeBox or CompatibleSchemeTypeBox, the track conforms to the constraints of scheme_type equal to 'podv' with all of the following additional constraint:
  ProjectionFormatBox within the ProjectedOmniVideoBox shall indicate either the equirectangular projection or the cubemap projection.

Fisheye Omnidirectional Video ('fodv')
The use of the fisheye omnidirectional video scheme for the restricted video sample entry type 'resv' indicates that the decoded pictures are fisheye video pictures. The use of the fisheye omnidirectional video scheme is indicated by scheme_type equal to 'fodv' (fisheye omnidirectional video) within the SchemeTypeBox or CompatibleSchemeTypeBox.

The format of fisheye video is indicated with the FisheyeOmniVideoBox contained within the SchemeInformationBox. One and only one FisheyeOmniVideoBox shall be present in the SchemeInformationBox when the scheme type is 'fodv'.

When FisheyeOmniVideoBox is present in the SchemeInformationBox, StereoVideoBox shall not be present in the same SchemeInformationBox.

The OMAF draft specification specifies two HEVC media profiles in clause 10.1. Of the two, the HEVC viewport independent baseline profile is reproduced below:

HEVC Viewport Independent Baseline Profile

General (Informative)

Both monoscopic and stereoscopic spherical video up to 360 degrees are supported. The profile requires neither viewport dependent delivery nor viewpoint dependent decoding. Regular HEVC encoders, DASH packagers, DASH clients, file format parsers, and HEVC decoder engines can be used for encoding, distribution and decoding. The profile also minimizes the options for basic interoperability.

Elementary Stream Constraints

The NAL unit stream shall comply with HEVC Main 10 profile, Main tier, Level 5.1.

All pictures shall be encoded as coded frames, and shall not be encoded as coded fields.

The following fields shall be set as follows:
general_progressive_source_flag shall be set to 1.
general_frame_only_constraint_flag shall be set to 1.
general_interlaced_source_flag shall be set to 0.
When VUI is present, aspect_ratio_info_present_flag shall be set to 1 and aspect_ratio_idc shall be set to 1 (square).

For each picture, there shall be an equirectangular projection SEI message present in the bitstream that applies to the picture.

When the video is stereoscopic, for each picture, there shall be a frame packing arrangement SEI message present in the bitstream that applies to the picture.

When the video does not provide full 360 coverage, for each picture, there shall be a region-wise packing SEI messages present in the bitstream that applies to the picture.

When present, the frame packing arrangement SEI messages and the region-wise packing SEI messages shall indicate constraints that comply with the equirectangular projected video scheme type 'erpv' specified in clause 7.3.1.2.

ISO Base Media File Format Constraints
compatible_brands in FileTypeBox shall include 'ovid'.
Video sample entry type shall be equal to 'resv'.
Constraints for 'resv' tracks as specified in clause 7 apply.
scheme_type values equal to 'podv' and 'erpv' shall be present within the SchemeTypeBox and CompatibleSchemeTypeBox.

The type of OriginalFormatBox within the RestrictedSchemeInfoBox shall be equal to 'hvc1'.

NOTE: Consequently, parameter sets are not present inband within samples.

LHEVCConfigurationBox shall not be present in OriginalFormatBox.

HEVCConfigurationBox in OriginalFormatBox shall indicate conformance to the elementary stream constraints specified in 10.1.2.2.

For the Decoder Configuration Record in the Sample Description Box, the following applies:

It shall contain one or more decoding parameter sets. (Containing VPS, SPS, and PPS NALs for HEVC Video). Each video Sample in the track shall reference a parameter set in the Sample entry.

When the video elementary stream contains a frame packing arrangement SEI message, StereoVideoBox shall be present. When StereoVideoBox is present, it shall signal the frame packing format that is included in the frame packing arrangement SEI message(s) in the elementary stream.

When the video elementary stream contains a region-wise packing SEI message, RegionWisePackingBox shall be present. When present, RegionWisePackingBox shall signal the same information as in the region-wise packing SEI message(s).

When the playback is intended to be started using another orientation than the orientation indicated by (azimuth, elevation) equal to (0, 0) relative to the global coordinate axes, the initial viewpoint region-on-sphere metadata, as specified in 7.5.4, shall be present.

Receiver Requirements

Receivers conforming to this media profile shall be capable of processing either all referenced SEI messages in 10.1.2.2 or all allowed boxes within the SchemeInformationBox for the equirectangular projected video scheme type.

CMAF Media Profile

This clause defines the CMAF Media Profile for the HEVC viewport independent baseline profile. This media profile may be signaled with the compatibility brand 'cvid'.

The CMAF Media Profile Track for the HEVC viewport independent baseline profile shall conform to both of the following:

The constraints specified in 10.1.2.3.
HEVC CMAF Video Track as defined in [CMAF], Annex B.1.

Note that by the combination of the two, only a restricted set of the HEVC CMAF Video Track may be used for this profile. Only 'hvc1' may be used based on the ISO BMFF Track Constraints. The presence and absence of the VUI parameters is given by CMAF.

A CMAF Switching Set for the HEVC viewport independent baseline profile shall conform to the CMAF Switching Set constraints as defined in [CMAF], Annex B.2.1.

In addition, for a CMAF Switching Set for the HEVC viewport independent baseline profile, the following applies:
The same projection format shall be used for all CMAF Tracks in one CMAF Switching Set.
The same frame packing format shall be used for all CMAF Tracks in one CMAF Switching Set.
The same coverage information shall be used for all CMAF Tracks in one CMAF Switching Set.
The same spatial resolution shall be used for all CMAF Tracks in one CMAF Switching Set.

The mapping to CMAF Addressable Objects follows the rules in [CMAF], clause 7.6.

DASH Integration

An instantiation of the HEVC viewport independent baseline profile in DASH should be represented as one Adaptation Set, possibly with multiple Representations. If so, the Adaptation Set should provide the following signaling:
@codecs='resv.podv.hvc1.1.6.L93.B0'
@mimeType='video/mp4 profiles="ovid"'
A Supplemental Descriptor or Essential Descriptor providing the frame packing arrangement may be used.

NOTE: By the use of the restricted video scheme and the @profiles referring to this media profile, the DASH client has all information to identify if this media profile can be played back. For additional information, the Supplemental Descriptor is used to provide some details on the configuration of the contained Representations.

The concatenation of all DASH Segments on one Representation for HEVC viewport independent baseline media profile shall conform to all the constraints specified in 10.1.2.3.

Conformance to CMAF may be provided in addition by conforming to a HEVC CMAF Video Track as defined in [CMAF], Annex B.1.

In addition, for an Adaptation Set the following applies:
The same projection format shall be used on all Representations in one Adaptation Set.
The same frame packing format shall be used on all Representations in one Adaptation Set.
The same coverage information shall be used on all Representations in one Adaptation Set.
The same spatial resolution shall be used on all Representations in one Adaptation Set.

When the playback is intended to be started using another orientation than the orientation indicated by (azimuth, elevation) equal to (0, 0) relative to the global coordinate axes, a Representation containing initial viewpoint region-on-sphere metadata, as specified in clause 7.5.4, shall be present and associated with all related media Representations as specified in 8.2.8.

This disclosure recognizes that the OMAF draft text does not support omnidirectional video with dynamic region-wise packing, where dynamic region-wise packing refers to region-wise packing schemes that can change within the set of file format samples referring to the same sample entry, to the most extent, from frame to frame. This does not enable VR media service providers to provide a single omnidirectional video bitstream providing the entire VR video content with the most requested regions being optimized with the largest number of color samples per unit of area.

By contrast, the techniques of this disclosure may enable VR media service providers to provide a single omnidirectional video bitstream providing the entire VR video content with the most requested regions being optimized with the largest number of color samples per unit of area. In particular, this disclosure describes techniques by which a VR media service provider, such as content preparation device 20 and/or server device 60, may encode, store, and stream omnidirectional video with dynamic region-wise packing, where dynamic region-wise packing refers to region-wise packing schemes that can change within the set of file format samples referring to the same sample entry, to the most extent, from frame to frame. Thus, content preparation device 20 and/or server device 60 may send, and client device 40 may receive, a single omnidirectional video bitstream providing the entire VR video content with the most requested regions being optimized with the largest number of color samples per unit of area. Content preparation device 20 and/or server device 60 may initialize the most requested regions as the regions by the director's cut, and update the most requested regions later using statistics, e.g., retrieval statistics from client devices such as client device 40 and other client devices in communication with server device 60 and/or content preparation device 20 via network 74.

Two examples are described in detail below, although it should be understood that the techniques of this disclosure are not limited to the following examples.

In a first example, content preparation device 20, server device 60, and client device 40 may be configured to use a new restricted scheme type, equirectangular projected video with dynamic region-wise packing ('erp2'). That is, content preparation device 20 and/or server device 60 may process (e.g., encode and/or transmit) and client device 40 may process (e.g., receive and/or decode) an omnidirectional video stream including a set of file format samples referring to a sample entry, the set of file format samples including a first frame having a first region-wise packing scheme and a second frame having a second, different region-wise packing scheme. This scheme type may be used for specifying media profiles. Content preparation device 20, server device 60, and client device 40 may be configured such that, when scheme_type is equal to 'erp2' in a SchemeTypeBox or CompatibleSchemeTypeBox, the track conforms to the constraints of scheme_type equal to 'podv' with the following additional constraints:

ProjectionFormatBox within the ProjectedOmniVideoBox shall indicate the equirectangular projection.
The RegionWisePackingBox may or may not be present. Regardless of whether the RegionWisePackingBox is present, the region-wise packing information signaled in the region-wise packing SEI messages, which may be dynamic across pictures, applies.

In this first example, content preparation device 20, server device 60, and client device 40 may be configured according to an updated definition of the HEVC viewport independent baseline profile. In particular, elementary stream constraints, ISO base media file format constraints, and DASH integration may be updated as follows. Other aspects may remain unchanged. In general, relevant portions of the specification text are reproduced below, with changes emphasized, such that italicized text represents additions to the specification text and removed portions are indicated using "[removed: "]".

Elementary Stream Constraints
The NAL unit stream shall comply with HEVC Main 10 profile, Main tier, Level 5.1.
All pictures shall be encoded as coded frames, and shall not be encoded as coded fields.
The following fields shall be set as follows:
general_progressive_source_flag shall be set to 1.
general_frame_only_constraint_flag shall be set to 1.
general_interlaced_source_flag shall be set to 0.
When VUI is present, aspect_ratio_info_present_flag shall be set to 1 and aspect_ratio_idc shall be set to 1 (square).
For each picture, there shall be an equirectangular projection SEI message present in the bitstream that applies to the picture.
When the video is stereoscopic, for each picture, there shall be a frame packing arrangement SEI message present in the bitstream that applies to the picture.
When the video does not provide full 360 coverage, for each picture, there shall be a region-wise packing SEI messages present in the bitstream that applies to the picture.
When present, the frame packing arrangement SEI messages and the region-wise packing SEI messages shall indicate constraints that comply with the equirectangular projected video scheme type 'erpv' or 'erp2'.

ISO Base Media File Format Constraints
compatible_brands in FileTypeBox shall include 'ovid'.
Video sample entry type shall be equal to 'resv'.
Constraints for 'resv' tracks as specified in clause 7 apply.
scheme_type values equal to either 'podv' and 'erpv' or 'podv' and 'erp2' shall be present within the SchemeTypeBox and CompatibleSchemeTypeBox.
The type of OriginalFormatBox within the RestrictedSchemeInfoBox shall be equal to 'hvc1'.

NOTE: Consequently, parameter sets are not present inband within samples.

LHEVCConfigurationBox shall not be present in OriginalFormatBox.

HEVCConfigurationBox in OriginalFormatBox shall indicate conformance to the elementary stream constraints specified in 10.1.2.2.

For the Decoder Configuration Record in the Sample Description Box, the following applies:

It shall contain one or more decoding parameter sets. (Containing VPS, SPS, and PPS NALs for HEVC Video). Each video Sample in the track shall reference a parameter set in the Sample entry.

When the video elementary stream contains a frame packing arrangement SEI message, StereoVideoBox shall be present. When StereoVideoBox is present, it shall signal the frame packing format that is included in the frame packing arrangement SEI message(s) in the elementary stream.

When the scheme type 'erpv' is present and when the video elementary stream contains a region-wise packing SEI message, the following applies:

RegionWisePackingBox shall be present.

When present, RegionWisePackingBox shall signal the same information as in the region-wise packing SEI message(s).

When the playback is intended to be started using another orientation than the orientation indicated by (azimuth, elevation) equal to (0, 0) relative to the global coordinate axes, the initial viewpoint region-on-sphere metadata, as specified in 7.5.4, shall be present.

DASH Integration

In addition to the existing DASH integration specifications, the restricted scheme type 'erpv' or 'erp2' is also signaled as an optional MIME type parameter.

In a second, alternative example, content preparation device 20, server device 60, and client device 40 may be configured with a definition of a new HEVC media profile that is equivalent to the updated definition of the HEVC viewport independent baseline profile above when the scheme_type equal to 'erp2' is present.

Figure 3:
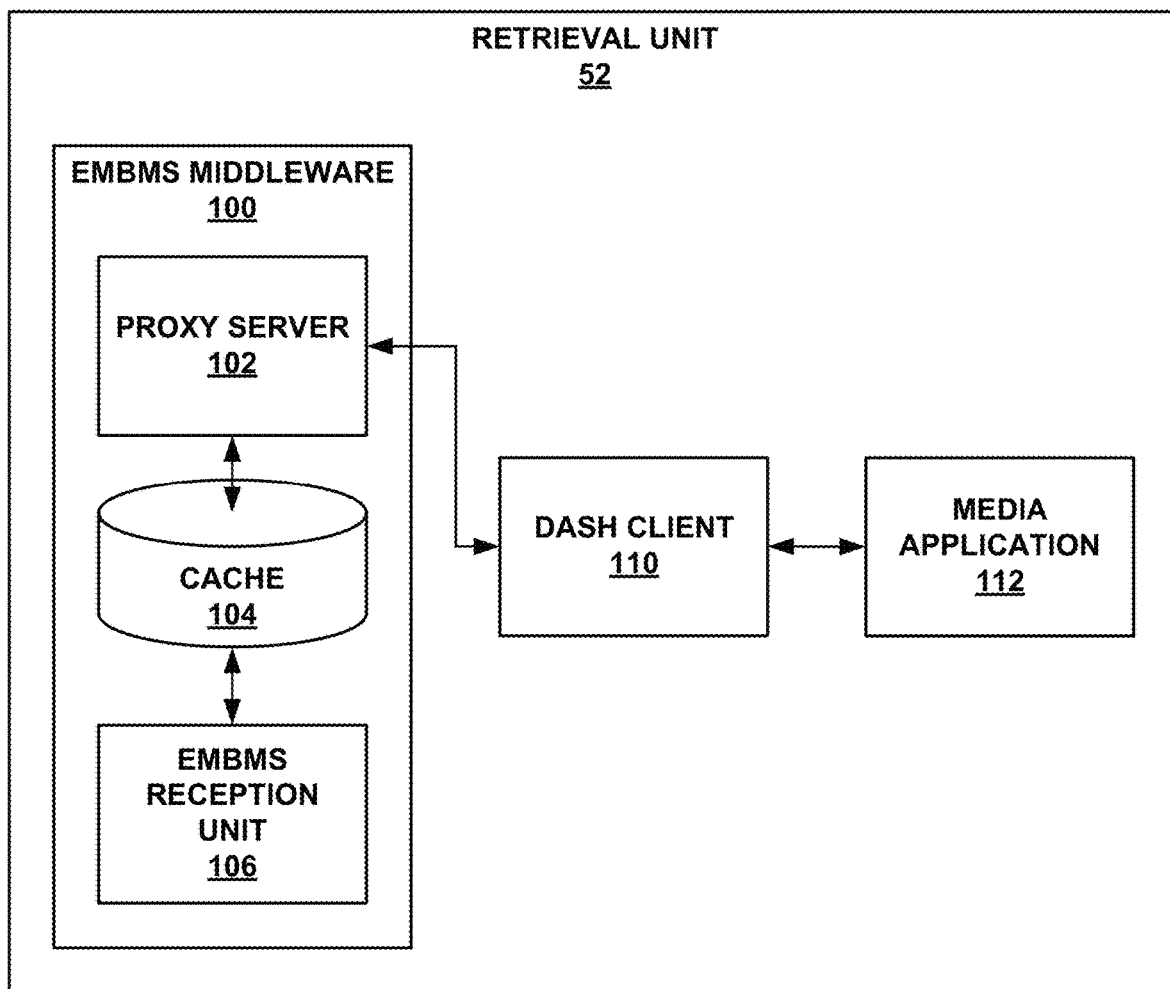
FIG. 3 is a block diagram illustrating an example set of components of a retrieval unit.

FIG. 3 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a broadcast multicast service center (BM-SC).

As eMBMS middleware unit 100 receives data for files, eMBMS middleware unit 100 may store the received data in cache 104. Cache 104 may comprise a computer-readable storage medium, such as flash memory, a hard disk, RAM, or any other suitable storage medium.

Proxy server 102 may act as a server for DASH client 110. For example, proxy server 102 may provide a MPD file or other manifest file to DASH client 110. Proxy server 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server 102. Proxy server 102 may retrieve requested data from cache 104 and provide the data to DASH client 110 in response to such requests.

DASH client 110 may be configured according to any or all of the techniques of this disclosure as discussed above, alone or in any combination.

Figure 4:
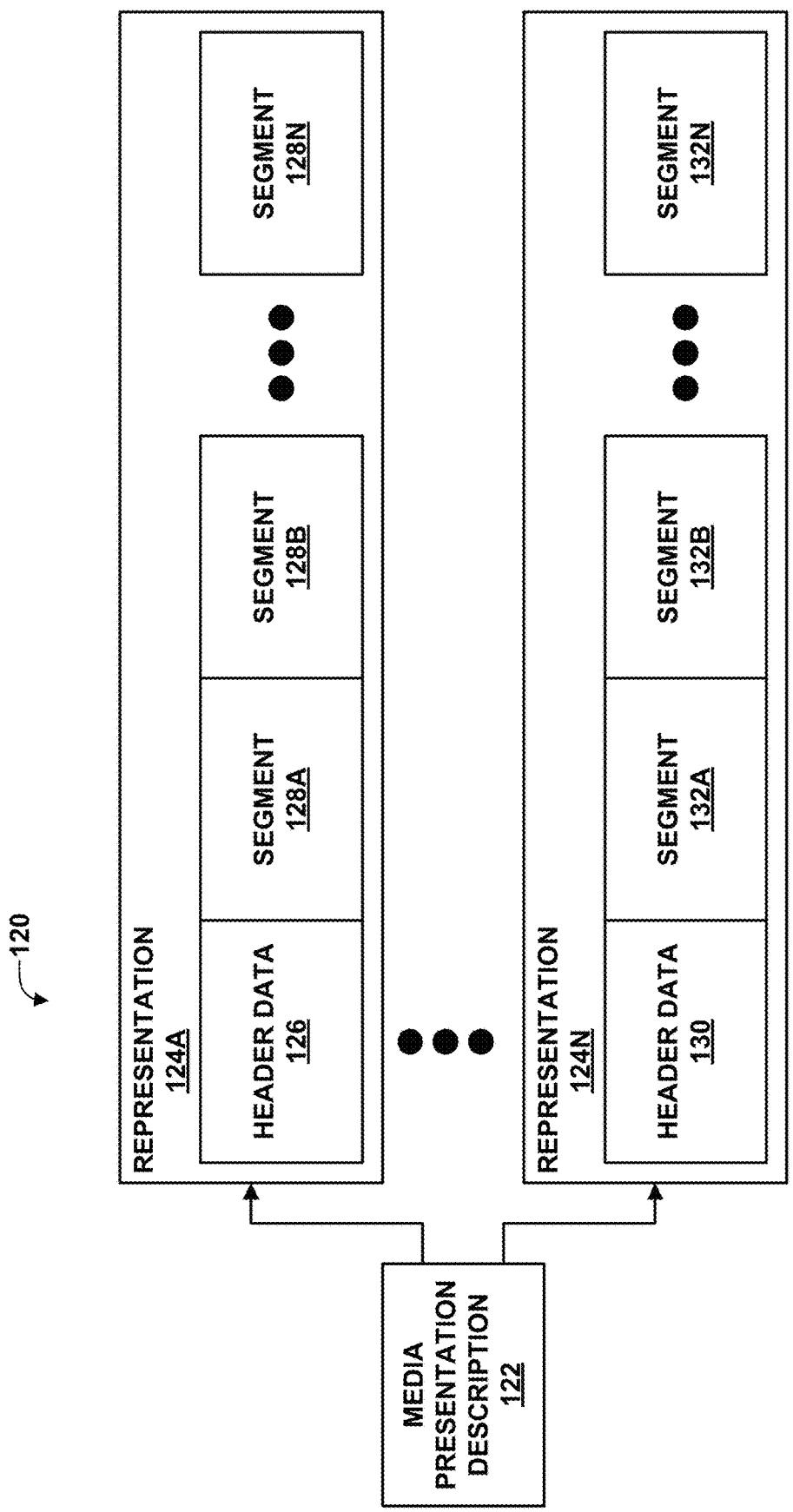
FIG. 4 is a conceptual diagram illustrating elements of example multimedia content.

FIG. 4 is a conceptual diagram illustrating elements of example multimedia content 120. Multimedia content 120 may correspond to multimedia content 64 (FIG. 1), or another multimedia content stored in storage medium 62. In the example of FIG. 4, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 3. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 4. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

MPD 122 may include data constructed according to any or all of the techniques of this disclosure, alone or in any combination.

Figure 5:
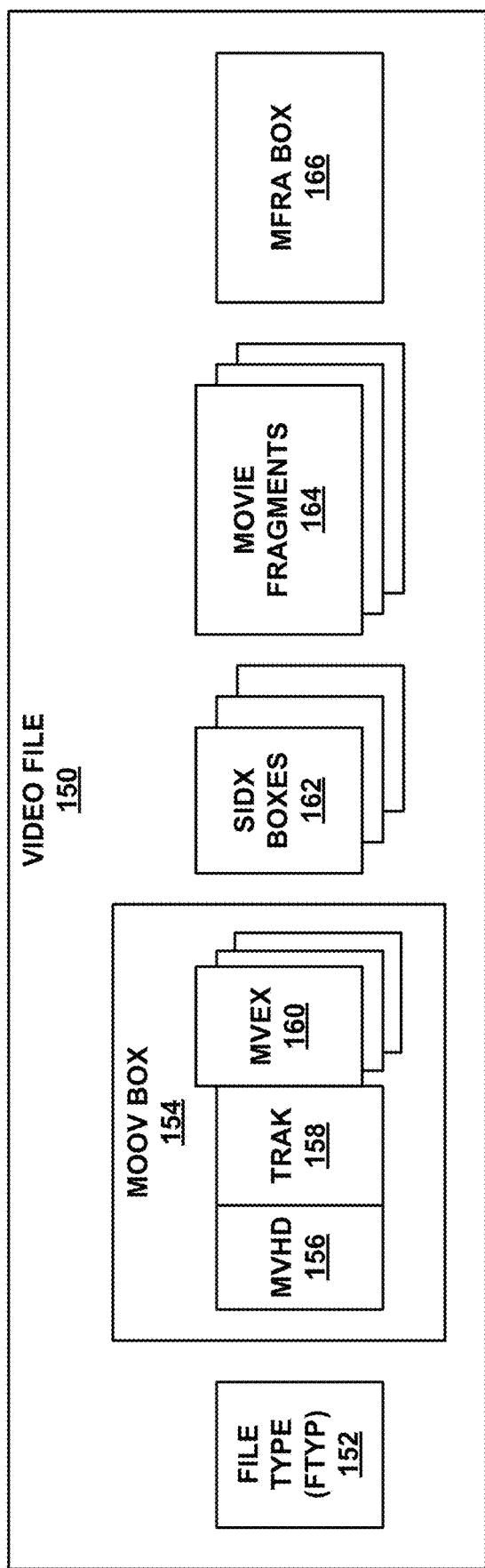
FIG. 5 is a block diagram illustrating elements of an example video file, which may correspond to a segment of a representation.

FIG. 5 is a block diagram illustrating elements of an example video file 150, which may correspond to a segment of a representation, such as one of segments 114, 124 of FIG. 4. Each of segments 128, 132 may include data that conforms substantially to the arrangement of data illustrated in the example of FIG. 5. Video file 150 may be said to encapsulate a segment. As described above, video files in accordance with the ISO base media file format and extensions thereof store data in a series of objects, referred to as "boxes." In the example of FIG. 5, video file 150 includes file type (FTYP) box 152, movie (MOOV) box 154, segment index (sidx) boxes 162, movie fragment (MOOF) boxes 164, and movie fragment random access (MFRA) box 166. Although FIG. 5 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
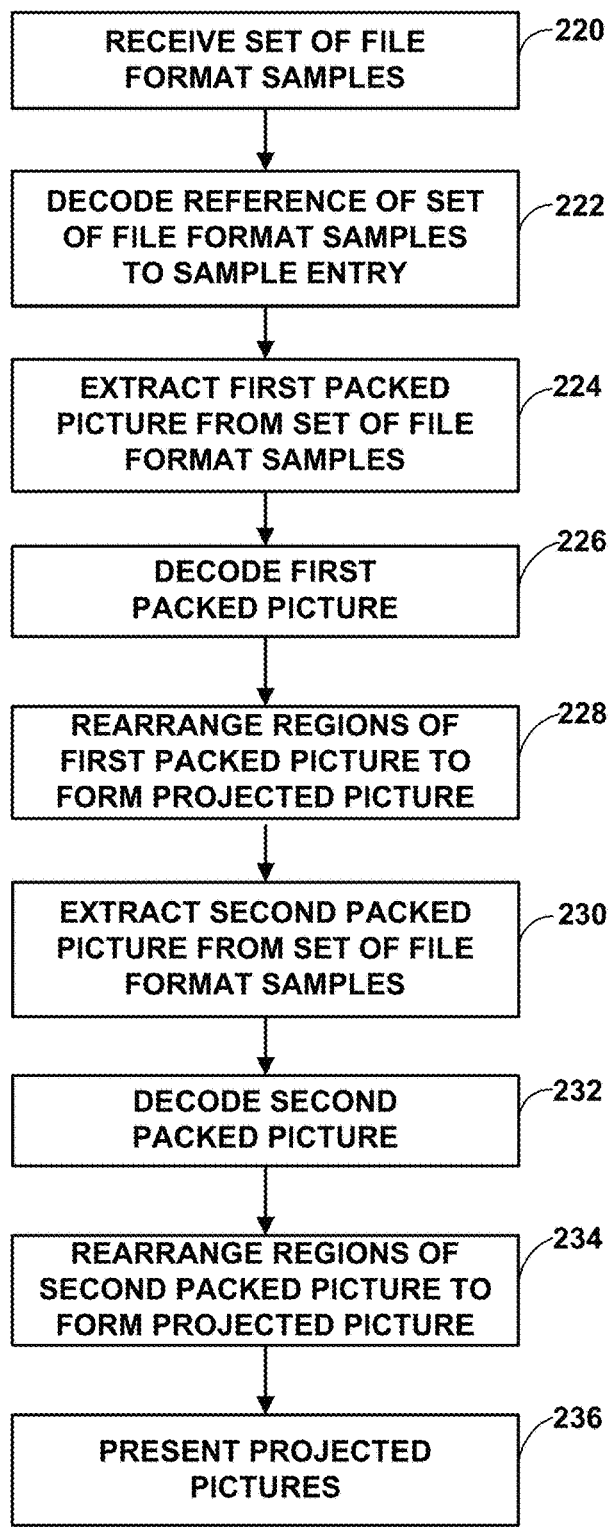
FIG. 7 is a flowchart illustrating another example method for processing video data of an omnidirectional video stream in accordance with the techniques of this disclosure.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 5, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 4) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 5). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Video file 150 may include data constructed according to any or all of the techniques of this disclosure, alone or in any combination. For example, movie fragments 164 may correspond to frames of a set of file format samples of video file 150. The set of file format samples may refer to a sample entry of video file 150. The frames of the set of file format samples may be dynamically region-wise packed. That is, two or more of the frames of the set of file format samples may have different region-wise packing schemes. In this manner, a single omnidirectional video stream may include an entire virtual reality (VR) video content having one or more most requested regions that are optimized with a largest number of color samples per unit of area. That is, the frames of the set of frames may each be arranged to concentrate a largest number of color samples per unit area in the frames.

A scheme type box ('schm' box) or compatible scheme type box of video file 150 may be included within a Meta box of video file 150, which itself may be included directly in video file 150, within MOOV box 154, or within TRAK box 158. The scheme type box or compatible scheme type box may include a scheme_type value of "erp2" to indicate that a corresponding track conforms to a scheme_type of "podv," with the additional constraints that: ProjectionFormatBox within the ProjectedOmniVideoBox shall indicate the equirectangular projection; and the RegionWisePackingBox may or may not be present. Regardless of whether the RegionWisePackingBox is present, the region-wise packing information signaled in the region-wise packing SEI messages, which may be dynamic across pictures, applies.

Figure 6:
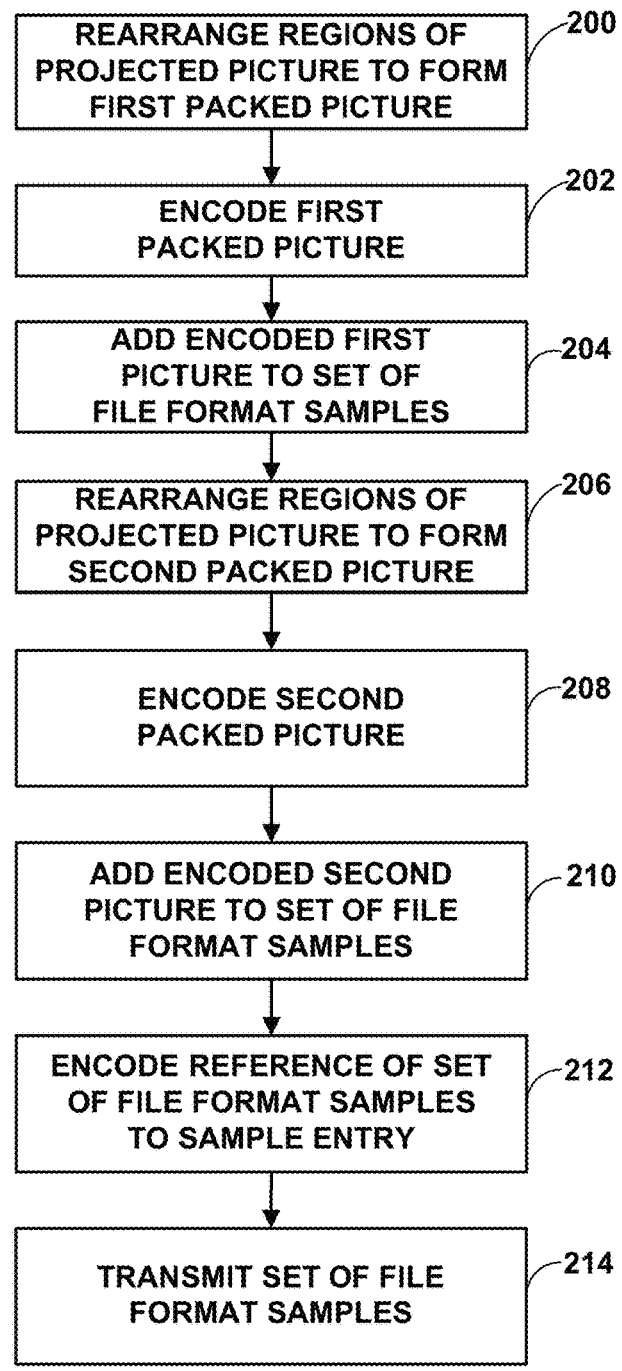
FIG. 6 is a flowchart illustrating an example method for processing video data of an omnidirectional video stream in accordance with the techniques of this disclosure.

FIG. 6 is a flowchart illustrating an example method for processing video data of an omnidirectional video stream in accordance with the techniques of this disclosure. In particular, in the example of FIG. 6, processing includes encoding and/or transmitting the omnidirectional video stream, and more particularly, frames of the omnidirectional video stream. The method of FIG. 6 is explained with respect to content preparation device 20 of FIG. 1 in this example, although it should be understood that other devices, such as server device 60, may be configured to perform this or a similar method.

Initially, content preparation device 20 may rearrange regions of a projected picture to form a first packed picture (200). For example, content preparation device 20 may perform region-wise packing of the projected picture, as shown in and described with respect to FIG. 2. In particular, content preparation device 20 may initially capture or otherwise obtain the projected picture from image data captured by video source 24. Video source 24 may capture one or more images, e.g., for virtual reality (VR) that would be projected onto a projection, such as a spherical projection. Thus, the images may be referred to as projected pictures. Content preparation device 20 may then rearrange regions of the projected picture according to a first region-wise packing scheme that optimizes a largest number of color samples per unit area of the first packed picture. For example, content preparation device 20 may pack the projected picture such that regions with larger numbers of color samples per unit area remain normally sized, but regions with lower numbers of color samples per unit area are decimated or otherwise reduced in resolution.

Video encoder 28 may then encode the first packed picture (202). Encapsulation unit 30 may then add the encoded first packed picture to a set of file format samples (204) of a video file, such as video file 150 of FIG. 5. The video file may correspond to a DASH segment, for example. Encapsulation unit 30 may further signal a value for a syntax element representing the first region-wise packing scheme for the first packed picture.

In a similar manner, content preparation device 20 may rearrange regions of another projected picture to form a second packed picture (206). Once again, the projected picture may be captured by video source 24, and content preparation device 20 may rearrange the regions according to a second region-wise packing scheme that optimizes a largest number of color samples per unit area of the second packed picture. Notably, the second region-wise packing scheme may be different than the first region-wise packing scheme.

Video encoder 28 may then encode the second packed picture (208), and encapsulation unit 30 may add the encoded second packed picture to the set of file format samples (210). Although two frames are discussed in FIG. 6 for purposes of example, it should be understood that content preparation device 20 may prepare multiple frames in this manner for the set of file format samples using dynamic region-wise packing.

Encapsulation unit 30 may further encode a reference value of the set of file format samples to correspond to a particular sample entry (212). That is, the set of file format samples (including the first and second packed frames) may correspond to a common sample entry. Content preparation unit 20 may then transmit the set of file format samples (which may correspond to a single omnidirectional video stream) via output interface 32 (214), e.g., to server device 60 or client device 40.

In this manner, the method of FIG. 6 represents an example of a method of processing video data including processing a first frame of a set of file format samples of an omnidirectional video stream, the set of file format samples referring to a sample entry, the first frame having a first region-wise packing scheme, and processing a second frame of the set of file format samples referring to the sample entry, the second frame having a second region-wise packing scheme different than the first region-wise packing scheme. In this case, "processing" may refer to either or both of encoding and/or transmitting.

FIG. 7 is a flowchart illustrating another example method for processing video data of an omnidirectional video stream in accordance with the techniques of this disclosure. In particular, in the example of FIG. 7, processing includes receiving and/or decoding the omnidirectional video stream, and more particularly, frames of the omnidirectional video stream. The method of FIG. 7 is explained with respect to client device 40 of FIG. 1 in this example, although it should be understood that other devices may be configured to perform this or a similar method.

Initially, client device 40 (and in particular, retrieval unit 52) receives a set of file format samples (220). In particular, the set of file format samples may be included in a single omnidirectional video stream. Client device 40 (and in particular, file processing unit 50) may decode a reference of the set of file format samples to a particular sample entry (222). That is, frames of the set of file format samples may correspond to a common sample entry.

File processing unit 50 may then extract a first packed picture from the set of file format samples (224). File processing unit 50 may provide the first packed picture to video decoder 48, which may decode the first packed picture (226). Client device 40 may further decode data representing a first region-wise packing scheme for the first packed picture, and then rearrange regions of the first packed picture accordingly to form a projected picture (228). For example, client device 40 may perform the inverse of the process shown in FIG. 2 and described with respect to FIG. 2. In general, client device 40 may rearrange resolution-reduced regions of the image and/or perform interpolation of the resolution-reduced regions of the image according to the first region-wise packing scheme.

File processing unit 50 may also extract a second packed picture from the set of file format samples (230). File processing unit 50 may provide the second packed picture to video decoder 48, which may decode the second packed picture (232). Client device 40 may further decode data representing a second region-wise packing scheme for the second packed picture, and then rearrange regions of the second packed picture accordingly to form a projected picture (234). Notably, the second region-wise packing scheme may be different than the first region-wise packing scheme, despite the first and second packed pictures being included within a set of file format samples corresponding to a common sample entry. Video output 44 may then present some or all of the image data of the projected pictures (236).

In this manner, the method of FIG. 7 represents an example of a method of processing video data including processing a first frame of a set of file format samples of an omnidirectional video stream, the set of file format samples referring to a sample entry, the first frame having a first region-wise packing scheme, and processing a second frame of the set of file format samples referring to the sample entry, the second frame having a second region-wise packing scheme different than the first region-wise packing scheme. In this case, "processing" may refer to either or both of receiving and/or decoding.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    processing a first frame of a set of file format samples of an omnidirectional video stream, the set of file format samples referring to a sample entry, the first frame having a first region-wise packing scheme, wherein the omnidirectional video stream includes a scheme type syntax element of file format information, the scheme type syntax element having a value indicating that the omnidirectional video stream includes equirectangular projected video with dynamic region-wise packing; and
    processing a second frame of the set of file format samples referring to the sample entry, the second frame having a second region-wise packing scheme different than the first region-wise packing scheme.

2. The method of claim 1, wherein processing the first frame and processing the second frame comprises processing the omnidirectional video stream as a single omnidirectional video stream including an entire virtual reality (VR) video content having one or more most requested regions that are optimized with a largest number of color samples per unit of area, the single omnidirectional video stream comprising the set of file format samples including the first frame and the second frame.

3. The method of claim 1, wherein the value of the scheme type syntax element is 'erp2'.

4. The method of claim 1, wherein the scheme type syntax element has a value of either 'podv' and 'erpv' or 'podv' and 'erp2'.

5. The method of claim 4, wherein when the scheme type 'erpv' is present in the omnidirectional video stream, the method includes determining that a region wise packing box is present in the omnidirectional video stream and that the region wise packing box signals information also signaled in one or more region-wise supplemental enhancement information (SEI) messages for the omnidirectional video stream.

6. The method of claim 5, wherein the region wise packing box is included in file format information of a file included in the omnidirectional video stream, the file including the set of file format samples.

7. The method of claim 1, wherein at least one of 'erpv' or 'erp2' scheme types are signaled in the omnidirectional video stream as optional MIME type parameters for a network streaming protocol.

8. The method of claim 7, wherein the network streaming protocol comprises Dynamic Adaptive Streaming over HTTP (DASH).

9. The method of claim 7, further comprising processing a manifest file for the network streaming protocol, the manifest file comprising the 'erpv' or 'erp2' scheme types.

10. The method of claim 9, wherein the manifest file comprises a media presentation description (MPD).

11. The method of claim 1, wherein the omnidirectional video stream conforms to a high efficiency video coding (HEVC) media profile that defines the scheme type syntax element value as indicating that the omnidirectional video stream includes the equirectangular projected video with dynamic region-wise packing.

12. The method of claim 1,
    wherein processing the first frame comprises encoding or transmitting the first frame, the method further comprising:
        determining the first region-wise packing scheme of the first frame; and
        encoding a first scheme type value for the first frame to indicate the first region-wise packing scheme of the first frame; and
    wherein processing the second frame comprises encoding or transmitting the second frame, the method further comprising:
        determining the second region-wise packing scheme of the second frame; and
        encoding a second scheme type value for the second frame to indicate the second region-wise packing scheme of the second frame.

13. The method of claim 1,
    wherein processing the first frame comprises receiving or decoding the first frame, the method further comprising:
        decoding a first scheme type value for the first frame; and
        determining the first region-wise packing scheme of the first frame from the first scheme type value; and
    wherein processing the second frame comprises receiving or decoding the second frame, the method further comprising:
        decoding a second scheme type value for the second frame; and
        determining the second region-wise packing scheme of the second frame from the second scheme type value.

14. The method of claim 1, further comprising:
    decoding the first frame;
    rearranging one or more regions of the first decoded frame according to the first region-wise packing scheme;
    decoding the second frame; and
    rearranging one or more regions of the second decoded frame according to the second region-wise packing scheme.

15. A device for processing video data, the device comprising:
    a memory configured to store an omnidirectional video stream, wherein the omnidirectional video stream includes a scheme type syntax element of file format information, the scheme type syntax element having a value indicating that the omnidirectional video stream includes equirectangular projected video with dynamic region-wise packing; and
    a processor implemented in circuitry and configured to:
        process a first frame of a set of file format samples of the omnidirectional video stream, the set of file format samples referring to a sample entry, the first frame having a first region-wise packing scheme; and
        process a second frame of the set of file format samples referring to the sample entry, the second frame having a second region-wise packing scheme different than the first region-wise packing scheme.

16. The device of claim 15, wherein the processor is configured to process the omnidirectional video stream as a single omnidirectional video stream including an entire virtual reality (VR) video content having one or more most requested regions that are optimized with a largest number of color samples per unit of area, the single omnidirectional video stream comprising the set of file format samples including the first frame and the second frame.

17. The device of claim 15, wherein the value of the scheme type syntax element is 'erp2'.

18. The device of claim 15, wherein the scheme type syntax element has a value of either 'podv' and 'erpv' or 'podv' and 'erp2'.

19. The device of claim 18, wherein the processor is configured to, when the scheme type 'erpv' is present in the omnidirectional video stream, determine that a region wise packing box is present in the omnidirectional video stream and that the region wise packing box signals information also signaled in one or more region-wise supplemental enhancement information (SEI) messages for the omnidirectional video stream.

20. The device of claim 19, wherein the region wise packing box is included in file format information of a file included in the omnidirectional video stream, the file including the set of file format samples.

21. The device of claim 15, wherein at least one of 'erpv' or 'erp2' scheme types are signaled as optional MIME type parameters for a network streaming protocol.

22. The device of claim 21, wherein the network streaming protocol comprises Dynamic Adaptive Streaming over HTTP (DASH).

23. The device of claim 21, wherein the processor is further configured to process a manifest file for the network streaming protocol, the manifest file comprising the 'erpv' or 'erp2' scheme types.

24. The device of claim 23, wherein the manifest file comprises a media presentation description (MPD).

25. The device of claim 15, wherein the omnidirectional video stream conforms to a high efficiency video coding (HEVC) media profile that defines the scheme type syntax element value as indicating that the omnidirectional video stream includes the equirectangular projected video with dynamic region-wise packing.

26. The device of claim 15,
wherein to process the first frame, the processor is configured to encode or transmit the first frame, and wherein the processor is further configured to:
determine the first region-wise packing scheme of the first frame; and
encode a first scheme type value for the first frame to indicate the first region-wise packing scheme of the first frame; and
wherein to process the second frame, the processor is further configured to encode or transmit the second frame, and wherein the processor is further configured to:
determine the second region-wise packing scheme of the second frame; and
encode a second scheme type value for the second frame to indicate the second region-wise packing scheme of the second frame.

27. The device of claim 15,
wherein to process the first frame, the processor is configured to receive or decode the first frame, and wherein the processor is further configured to:
decode a first scheme type value for the first frame; and
determine the first region-wise packing scheme of the first frame from the first scheme type value; and
wherein to process the second frame, the processor is configured to receive or decode the second frame, and wherein the processor is further configured to:
decode a second scheme type value for the second frame; and
determine the second region-wise packing scheme of the second frame from the second scheme type value.

28. A non-transitory computer-readable storage medium having stored thereon instructions that, when executed, cause a processor to:
process a first frame of a set of file format samples of an omnidirectional video stream, the set of file format samples referring to a sample entry, the first frame having a first region-wise packing scheme, wherein the omnidirectional video stream includes a scheme type syntax element of file format information, the scheme type syntax element having a value indicating that the omnidirectional video stream includes equirectangular projected video with dynamic region-wise packing; and
process a second frame of the set of file format samples referring to the sample entry, the second frame having a second region-wise packing scheme different than the first region-wise packing scheme.

* * * * *